W. C. MEYER.
FRICTION CLUTCH.
APPLICATION FILED JAN. 2, 1914.

1,165,799.

Patented Dec. 28, 1915.

Witnesses
Edward S. Kay
H. D. McPhail

Inventor
William C. Meyer
by
Phillips Van Everen & Fish
Attys

UNITED STATES PATENT OFFICE.

WILLIAM C. MEYER, OF BEVERLY, MASSACHUSETTS, ASSIGNOR TO UNITED SHOE MACHINERY COMPANY, OF PATERSON, NEW JERSEY, A CORPORATION OF NEW JERSEY.

FRICTION-CLUTCH.

1,165,799. Specification of Letters Patent. Patented Dec. 28, 1915.

Application filed January 2, 1914. Serial No. 809,986.

*To all whom it may concern:*

Be it known that I, WILLIAM C. MEYER, a citizen of the United States, residing at Beverly, in the county of Essex and State of Massachusetts, have invented certain new and useful Improvements in Friction-Clutches; and I do hereby declare the following to be a full, clear, and exact description of the invention, such as will enable others skilled in the art to which it appertains to make and use the same.

The invention relates to cone clutches or brakes in which the engaging surface of the clutch members are conical or tapered.

The object of the invention is to provide a novel and improved construction of clutch member which will enable the clutch members to be readily and easily disengaged without danger of sticking or undue wear upon the parts, even when the clutching surfaces have a comparatively small angle requisite for securing an effective friction between them.

To this end the invention consists in the features of construction and combinations of parts hereinafter described and referred to in the claims.

The features of the invention will be readily understood from an inspection of the accompanying drawings and the following detailed description of the construction illustrated therein.

Figure 1:
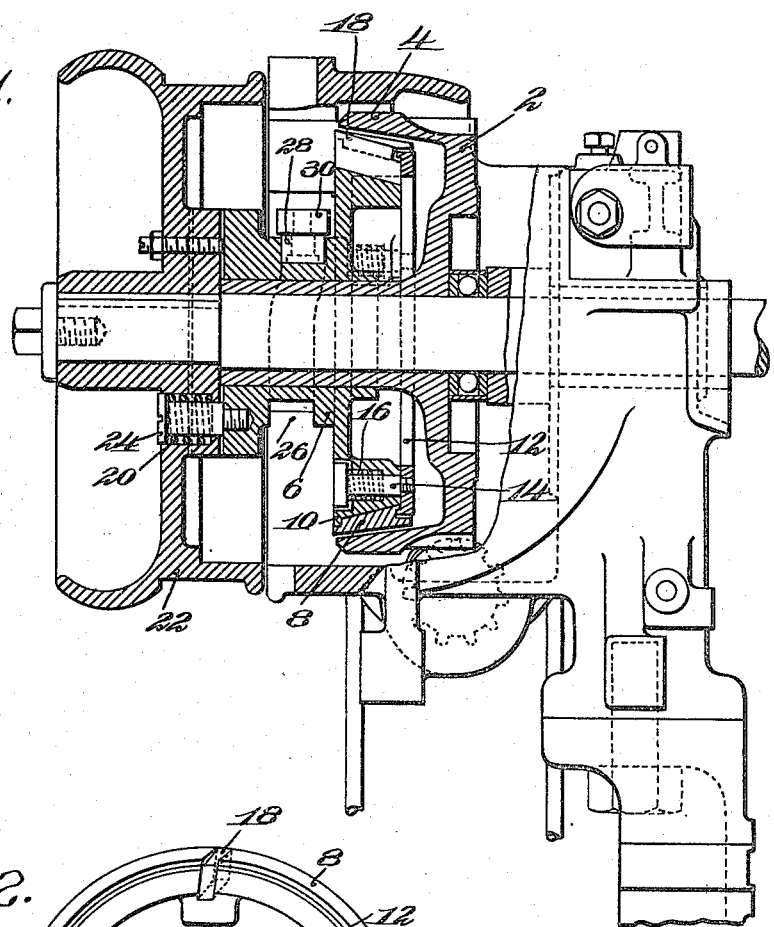
Figure 2:
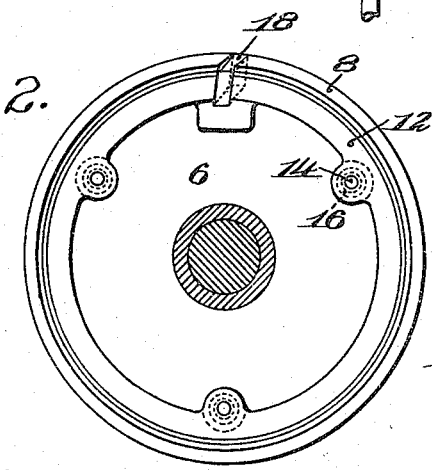
Figure 4:
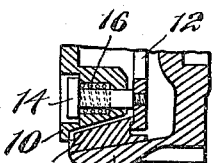
Figure 3:
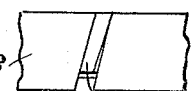

In the drawings, Figure 1 is a vertical sectional view through the axis of a clutch embodying the invention in its preferred form, Fig. 2 is a detailed elevation of the clutch member embodying the invention looking toward the left in Fig. 1. Fig. 3 is a detail plan view of the key for connecting the clutch body and clutch shoe, and Fig. 4 is a sectional detail view showing the clutch body withdrawn from the clutch shoe.

In the drawings the invention is illustrated as embodied in a clutch for transmitting motion, although it will be understood that the invention may be embodied with equal advantage in a clutch which is adapted to act as a brake for retarding or stopping a rotary member.

In the construction shown in the drawings, one member of the clutch consists of a rotating gear 2 provided with a flange 4 having a conical inner clutching surface. The other member of the clutch comprises a clutch body 6 having a conical periphery upon which is mounted a clutch shoe 8 in the form of a divided ring surrounding the body. The ring 8 is provided with an inner conical face fitting the conical periphery of the body and with an outer conical face adapted to fit the conical surface of the flange 4, the angle of the inner surface of the ring and periphery of the clutch body being considerably greater than the angle of the clutching face of the ring. The divided ring 8 is held on the clutch body between a flange 10 on the body and an annular retaining ring 12 which engages the inner end of the clutch ring. The retaining ring 12 is connected with the clutch body by a series of studs 14 secured to the ring and passing through holes formed in the body. The ring is retained in position against the end of the clutch body by springs 16 interposed between the heads of the studs and the bottoms of recesses formed in the clutch body. There is a slight clearance between the inner surfaces of the heads of the studs 14 and the recesses within which they fit, so that the clutch body 6 may have a limited axial movement with relation to the retaining ring 12 and the clutching ring 8 when the clutch is to be disengaged. The clutching ring 8 is connected to rotate with the clutch body by a key 18 secured in the clutch body and fitting in the slot formed between the ends of the ring. The key is preferably arranged obliquely to the elements of the conical surfaces of the clutch body and ring so that it will act to give the clutching ring Fig. 3 a slight rotary movement when the clutch body moves with relation to the ring.

In the construction shown the clutch body 6 is moved in a direction to disengage the clutch by a spring 20 which is interposed between the bottom of a recess in the driving pulley 22 and the head of a stud 24 which passes through a hole in the pulley and is secured in the hub of the clutch body. The clutch body is moved against the tension of the spring 20 to engage the clutch by a cam groove 26 formed in the hub of the clutch body and engaged by a roll 28 carried on the end of a lever 30. During the normal running of the machine illustrated, the machine is driven through the pulley 22 and the members of the clutch rotate idly. At this time the lever 30 is free to oscillate. When the machine is to be stopped, the driving mechanism through which the pulley 22 is rotated is thrown out, and the lever 30 is held against movement. When this occurs, the rotation of the pulley 22 under the momentum of the connected parts causes the cam groove 26 to act on the roll 28 and force the clutch body 6 toward the right in Fig. 1, thus engaging the clutching ring 8 Fig. 4 with the clutch member 4. The pulley and connected parts are now driven from the gear 2 until the cam groove, acting on the roll 28, moves the clutch body 6 toward the left to disengage the clutch. When this occurs the clutch body 6 first move axially with relation to the clutch ring 8, thus withdrawing the support for the ring so that it easily releases itself from the flange 4. The obliquely arranged key 18 turns the clutching ring 8 slightly as the clutch body starts toward the left, thus facilitating the disengagement of the clutching ring 8 from the flange 4. As soon as the clutching ring 8 lets go of the flange 4, the springs 16 return it to normal position upon the clutch body so that it is again rigidly supported upon the periphery of the clutch body.

With the above construction the angle of the supporting surfaces upon the clutch body and inner surface of the clutching ring may be such that it offers comparatively little frictional resistance to the axial movement of the clutch body with relation to the clutching ring. The clutching surface of the ring 8 may however have a comparatively small angle, so that an effective frictional grip between this surface and the flange 4 may be secured without the use of non-metallic friction material.

While it is preferred to employ the specific construction and arrangement of parts shown and described, it will be understood that this construction and arrangement is not essential to the broader features of the invention, and may be varied and modified without departing therefrom.

Having explained the nature and object of the invention, and specifically described one form of mechanism in which it may be embodied, what is claimed is:—

1. A friction clutch, having in combination, a clutch shoe having a conical clutching surface and a tapered supporting surface of greater angle, a clutch body having a tapered supporting surface fitting the supporting face of the shoe, and means for holding the shoe in engagement with the body and permitting limited axial movement of the body relative to the shoe.

2. A friction clutch, having, in combination, a clutch body having a conical supporting surface, a divided ring having a conical surface fitting the clutch body and a conical clutching surface of less angle, means for yieldingly holding the ring on the body, and means connecting the ring and body to turn together.

3. A friction clutch, having, in combination, a clutch body having a conical periphery, a divided ring having a conical inner face fitting the body and a conical outer face of less angle, one or more springs for holding the ring on the body, and a key connecting the ring and body.

4. A friction clutch, having, in combination, a clutch body having a conical periphery, a divided ring having a conical inner face fitting the body and a conical outer face of less angle, a retaining ring movable axially on the body engaging the end of the divided ring, and springs for resisting axial movement of the retaining ring.

5. A friction clutch, having, in combination, a clutch body having a conical periphery, a divided ring having a conical inner face fitting the body and a conical clutching face of less angle, an obliquely arranged key connecting the ring and body, and springs for holding the ring against axial movement with relation to the body.

WILLIAM C. MEYER.

Witnesses:
CHESTER E. ROGERS,
LONA A. MILLER.

Copies of this patent may be obtained for five cents each, by addressing the "Commissioner of Patents, Washington, D. C."

It is hereby certified that in Letters Patent No. 1,165,799, granted December 28, 1915, upon the application of William C. Meyer, of Beverly, Massachusetts, for an improvement in "Friction-Clutches," errors appear in the printed specification requiring correction as follows: Page 1, line 91, strike out the abbreviation and numeral "Fig. 3"; same page, line 93, after the word "ring" insert *Fig. 3;* page 2, lines 8-9, strike out the abbreviation and numeral "Fig. 4"; same page, line 14, for the word "move" read *moves;* line 15, after the reference-numeral "8" insert *Fig. 4;* and that the said Letters Patent should be read with these corrections therein that the same may conform to the record of the case in the Patent Office.

Signed and sealed this 1st day of February, A. D., 1916.

[SEAL.]

J. T. NEWTON,
*Acting Commissioner of Patents.*

Cl. 192—8